(12) United States Patent
Fuehrer

(10) Patent No.: US 8,855,109 B2
(45) Date of Patent: Oct. 7, 2014

(54) METHOD AND DEVICE FOR TRANSMITTING DATA IN MESSAGES ON A BUS SYSTEM

(75) Inventor: Thomas Fuehrer, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 1379 days.

(21) Appl. No.: 10/719,345

(22) Filed: Nov. 21, 2003

(65) Prior Publication Data

US 2004/0146051 A1 Jul. 29, 2004

(30) Foreign Application Priority Data

Nov. 22, 2002 (DE) .................. 102 54 580

(51) Int. Cl.
*H04L 12/50* (2006.01)
*H04L 12/40* (2006.01)
*H04L 1/08* (2006.01)
*H04L 1/00* (2006.01)
*H04L 12/407* (2006.01)

(52) U.S. Cl.
CPC .......... *H04L 12/407* (2013.01); *H04L 12/4013* (2013.01); *H04L 1/08* (2013.01); *H04L 2012/40241* (2013.01); *H04L 1/0083* (2013.01); *H04L 2012/40215* (2013.01); *H04L 2012/40273* (2013.01)
USPC .......................................... 370/362; 370/458

(58) Field of Classification Search
USPC .................. 370/468, 445, 447, 458, 461, 462
See application file for complete search history.

(56) References Cited

U.S. PATENT DOCUMENTS

| | | | |
|---|---|---|---|
| 3,760,371 A | | 9/1973 | Pitroda et al. |
| 4,709,376 A | | 11/1987 | Kage |
| 5,396,494 A | * | 3/1995 | Roposh ........................ 370/439 |
| 5,581,557 A | | 12/1996 | Stessens et al. |
| 5,666,358 A | * | 9/1997 | Paratore et al. ............... 370/347 |
| 5,745,487 A | * | 4/1998 | Hamaki ....................... 370/352 |
| 6,621,830 B1 | * | 9/2003 | Semple et al. ............... 370/468 |
| 6,920,504 B2 | * | 7/2005 | Bender et al. ................ 709/232 |
| 7,075,898 B2 | * | 7/2006 | Weigl et al. .................. 370/257 |
| 7,171,579 B2 | * | 1/2007 | Weigl et al. .................. 713/600 |
| 2001/0021196 A1 | * | 9/2001 | Weigl et al. .................. 370/444 |
| 2002/0001294 A1 | * | 1/2002 | Amouris ....................... 370/337 |
| 2002/0067763 A1 | * | 6/2002 | Suzuki et al. ................. 375/219 |
| 2002/0126691 A1 | * | 9/2002 | Strong ......................... 370/447 |
| 2003/0043840 A1 | * | 3/2003 | Kurokawa et al. ............ 370/447 |
| 2003/0088694 A1 | * | 5/2003 | Patek et al. ................... 709/238 |
| 2006/0104371 A1 | * | 5/2006 | Schuermans et al. ......... 375/257 |
| 2006/0153130 A1 | * | 7/2006 | Laroia et al. ................. 370/329 |

FOREIGN PATENT DOCUMENTS

| | | |
|---|---|---|
| DE | 3426568 | 1/1986 |
| WO | WO97/03403 | 1/1997 |

* cited by examiner

*Primary Examiner* — Gary Mui
(74) *Attorney, Agent, or Firm* — Kenyon & Kenyon LLP

(57) ABSTRACT

A method for transmitting data in messages on a bus system where the messages are transmitted in transmission time slots at a certain transmission rate, the transmission rate within a transmission time slot being changeable in such a way that the message, allocated to this transmission time slot, may be transmitted repeatedly within this transmission time slot.

5 Claims, 3 Drawing Sheets

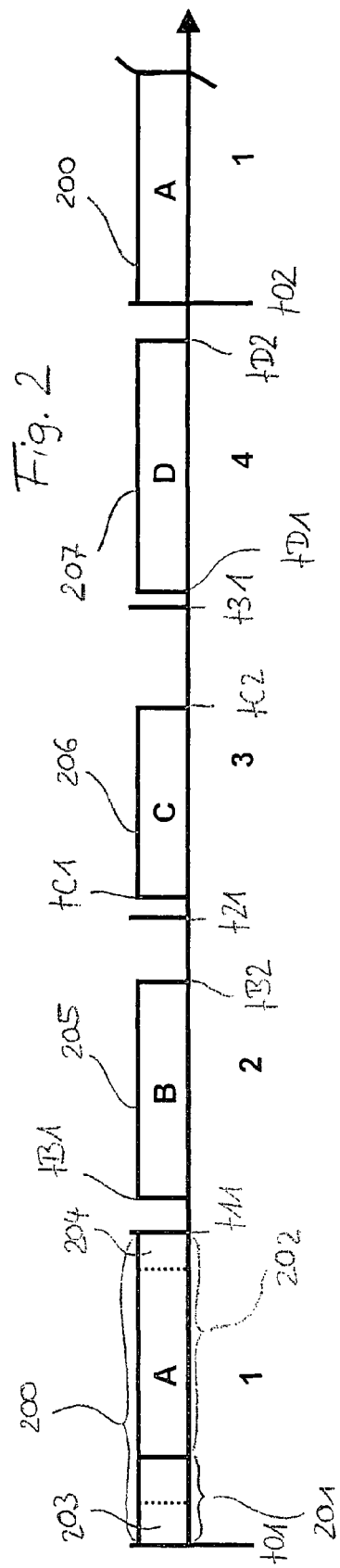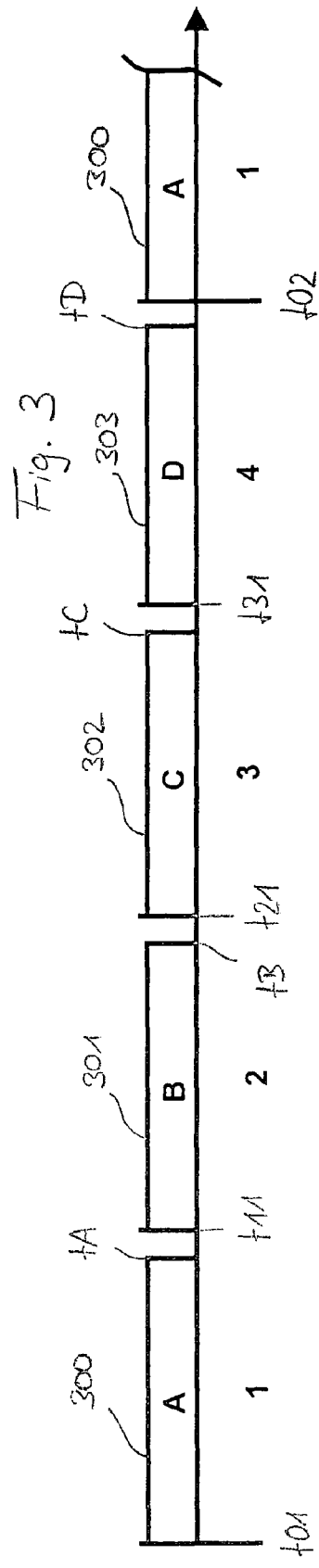

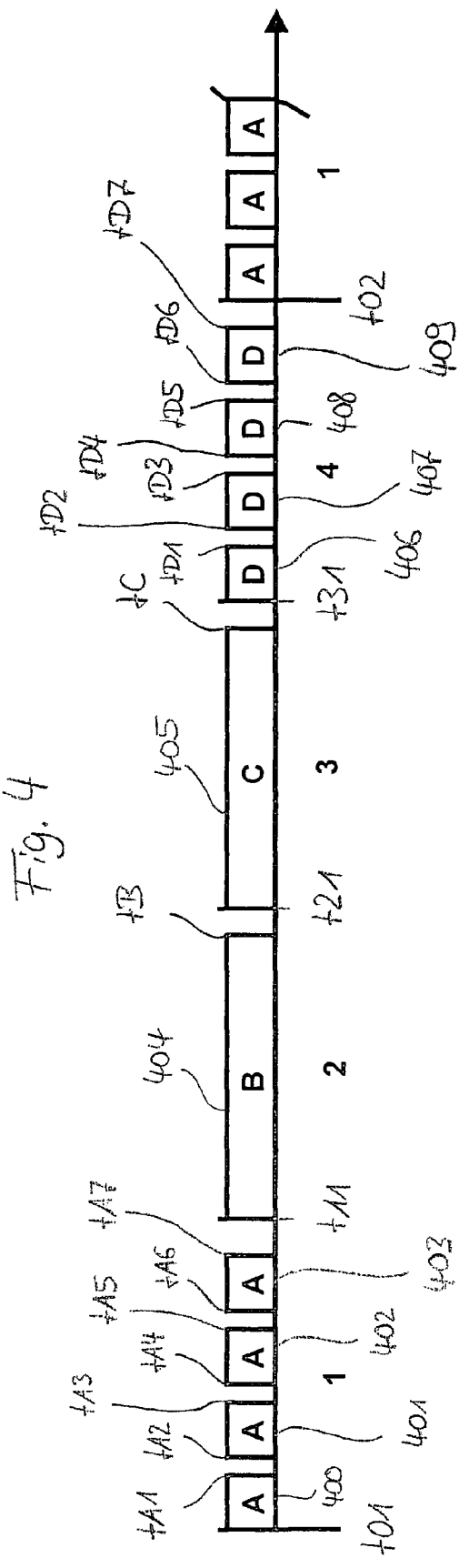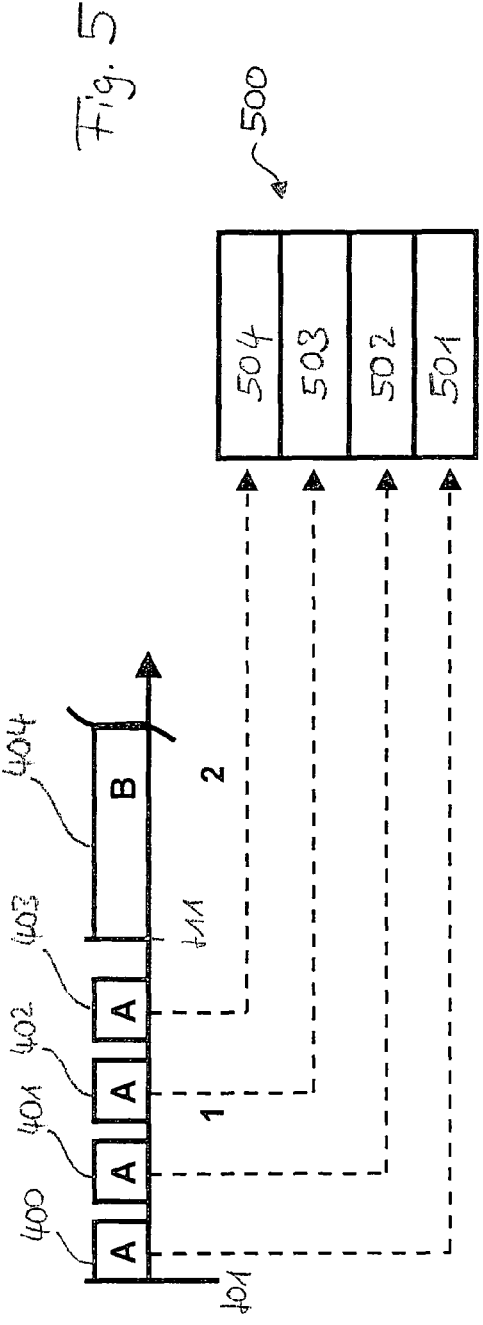

METHOD AND DEVICE FOR TRANSMITTING DATA IN MESSAGES ON A BUS SYSTEM

FIELD OF THE INVENTION

The present invention relates to a method and a device for transmitting data in messages on a bus system, the messages being transmitted in transmission time slots.

BACKGROUND INFORMATION

Interconnection of control units, sensor systems and actuator systems with the aid of a communication system, such as a bus system, has increased dramatically in recent years in modern automotive engineering, or also in machine construction, in particular in the machine tool area, as well as in automation. Synergies can be achieved here by distributing functions to multiple control units. This is known as distributed systems where the communication between different stations increasingly takes place via a bus, or a bus system. The communication traffic on the bus system, the access and reception mechanisms, as well as troubleshooting, are controlled via a protocol. CAN (Controller Area Network) is established as the protocol in the automotive area. This is an event-controlled protocol, i.e., protocol activities such as transmitting a message are initiated by events which have their origin outside the communication system itself. The unambiguous access to the communication system, i.e., the bus system, is provided via a priority-based bit arbitration. A prerequisite for this is that each message is assigned an unambiguous priority. The CAN protocol is very flexible. Adding more nodes and messages is possible without problem as long as there are still free priorities.

An alternative approach to such an event-controlled spontaneous communication is the purely time-controlled approach. All communication activities on the bus are strictly periodical. Protocol activities such as the transmission of a message are triggered by the progression of a time valid for the entire bus system. Access to the medium is based upon the allocation of time periods or transmission time slots in which a transmitter has exclusive transmitting rights. Addition of new nodes becomes possible when the particular transmission time slots have been left free beforehand. This circumstance forces the message sequence to be established prior to startup, a timetable being created which must meet the requirements of the messages with regard to the repeat rate, redundancy, deadlines, etc.

In addition to the event-controlled approach and the purely time-controlled approach, a time-controlled CAN approach, the TTCAN (Time Triggered Controller Area Network), is also known. This TTCAN meets the above-mentioned requirements for time-controlled communication, as well as the requirements for a certain degree of flexibility. The TTCAN conforms to this via the configuration of the communication cycle (basic cycle) into what is known as exclusive time windows or transmission time slots for periodic messages of certain communication stations and arbitrating time windows or arbitrating transmission time slots for spontaneous messages of multiple communication stations.

Purely time-controlled communication systems, as well as time-controlled bus systems such as TTCAN, are based on the fact that the messages are cyclically transmitted in a firmly set time scheme. The sequence is derived from a free-running time module (global time). The time scheme (communication cycle) is divided into multiple transmission slots or time slots. Repeated transmission of a message in the same communication cycle is in principle not provided in the related art mentioned. However, redundancy with regard to the message content should be achieved if an additional transmission time slot and thus an additional message is allocated to the same message content. However, in this case the communication cycle is changed due to the redundant message contents, since an additional transmission time slot must be provided.

Therefore, it is an object of the present invention to generate redundancy with regard to the message content without changing the communication cycle for this purpose.

SUMMARY OF THE INVENTION

The present invention shows a method and a device for transmitting data in messages on a bus system where the messages are transmitted in transmission time slots at a certain transmission rate, the transmission rate within a transmission time slot being changeable in such a way that the message allocated to this transmission time slot may be transmitted repeatedly within this transmission time slot. This multiple transmission, due to an increased data throughput in one transmission time slot, makes a redundancy with regard to the messages possible without having to occupy an additional transmission time slot in the communication cycle for the same message, and thus without changing the communication cycle. The time period of the transmission time slot advantageously remains unchanged.

It is a further advantage that at least two of the messages transmitted repeatedly in one transmission time slot are compared with one another, so that in the event of deviations with respect to at least parts of the messages, a fault may be detected.

In a particular design, N, but at least three, of the messages transmitted repeatedly in one transmission time slot are compared with one another and, within the scope of an M out of N deviation with regard to at least parts of the messages, at least one message is detected as faulty, messages detected as faulty being rejected, with integral N>2 and integral M with N/2<M<N.

As a practical matter, one message is unambiguously allocated to one transmission time slot, whereby the message receives a certain position in a communication cycle.

Furthermore, it is an advantage that the transmission rate within a transmission time slot for redundant transmission of the messages is multiplied by an integral factor so that, without changing the messages, redundancy is achieved corresponding to the integral factor of the multiplication.

The messages are advantageously constructed in such a way that the beginning and the end of the message are unambiguously detectable so that the time-redundant messages in one transmission time slot may unambiguously be differentiated by the receiving station. In particular, an unambiguous identifier for the beginning of the message and an unambiguous identifier for the end of the message may be provided here.

In particular, the messages contain identifications and data, the identification identifying the data content, the messages transmitted repeatedly within one transmission time slot being identical at least with regard to the identification and the data. This advantageously ensures that at least the message content is identical in the form of data, although the message frames may possibly differ from one another, which represents a very special design.

As a practical matter, the messages transmitted repeatedly in one transmission time slot are then compared with one another and are, at least in the event of deviations, checked for faults with regard to identification and/or data, particularly within the scope of an M out of N deviation with regard to identification and/or data as mentioned above.

Memory means are advantageously provided in the particular device in which the messages, transmitted repeatedly within the particular transmission time slot, may be stored in the chronological order of their transmission, in particular to perform the above-mentioned comparisons.

The present invention thus makes it possible to operate a particular communication system or bus system under full workload without providing redundant transmission time slots and without having to change the communication cycle, e.g., in the event of an adjustment of a bus schedule or a communication matrix with regard to the redundancies mentioned. Furthermore, in security-sensitive systems in certain areas in particular, a second redundant communication channel may possibly be omitted.

BRIEF DESCRIPTION OF THE DRAWINGS

FIG. 2 shows a first illustration of a communication cycle including messages within different transmission time slots.

FIG. 3 shows, in another illustration of a communication cycle, messages having equidistant message frames.

FIG. 4 illustrates the multiple transmission of the messages within one transmission time slot according to the present invention.

FIG. 5 shows, in a particular implementation, the storage of the redundant messages in memory means according to their chronological order.

DETAILED DESCRIPTION

Figure 1:
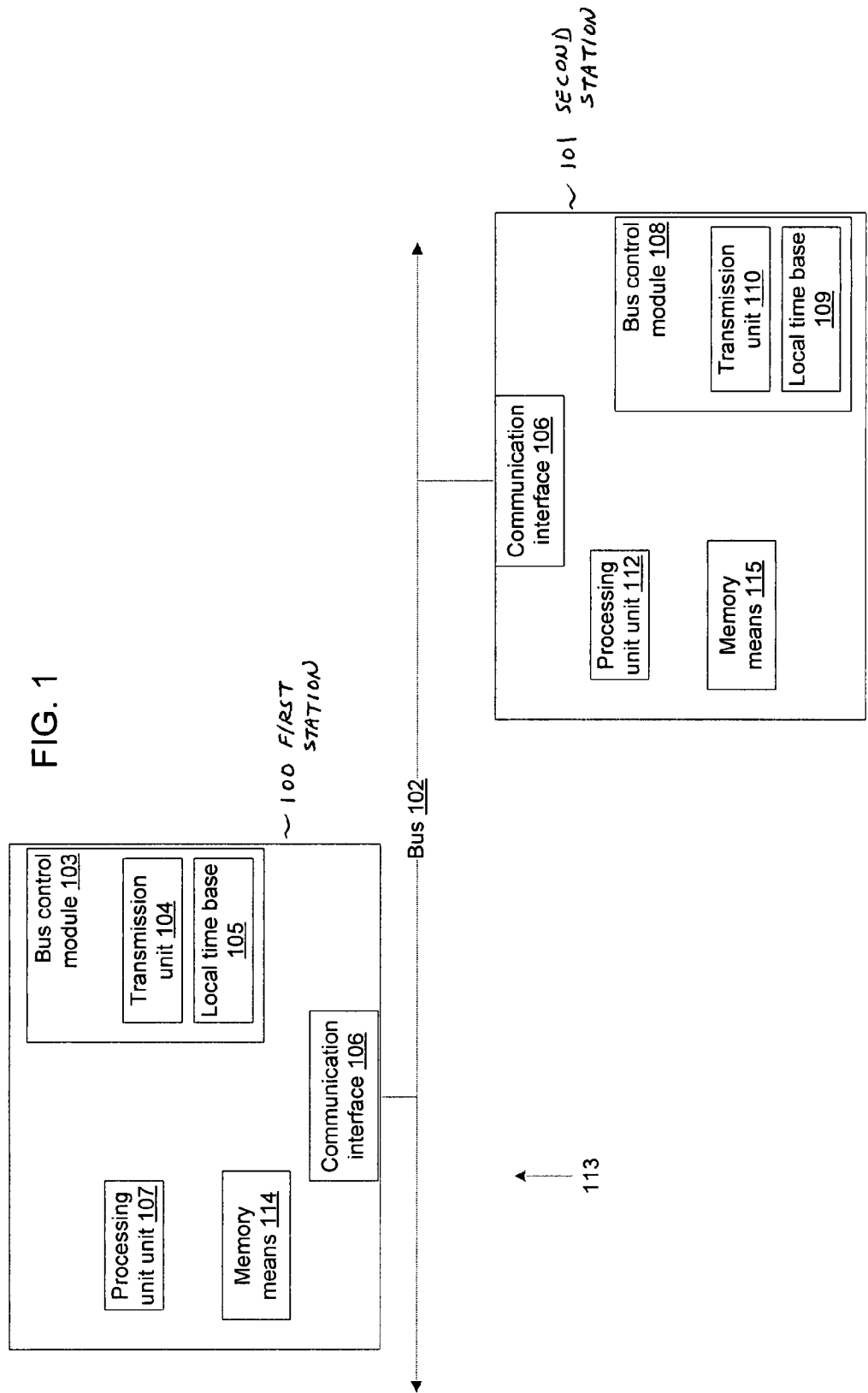
FIG. 1 shows a general illustration of a bus system having two stations.

FIG. 1 shows a bus system 113 having a first station 100 and a second station 101 which are connected to one another via a communication connection, i.e., a bus 102. The numbers 103 and 108 identify a bus control module, also known as a bus controller, in each of the stations. The two communication interfaces 106 and 111 as the connection to the communication connection, i.e., bus 102, are shown separately here; however, they may also be accommodated in bus controller 103 or 108, or their functionality may be taken over by bus controller 103 or 108. Bus system 113 thus shows two stations having one bus 102 in the form of a distributed system. Since communication is possible via the stations themselves or via processors or control units contained therein, as well as via separate control units, e.g., the bus controller, which may be positioned internally or externally with respect to the station, the terms bus system and distributed system or communication system may be used synonymically in the following. This means that the bus system may be merely the communication connection to control units for maintaining or executing the communication, as well as the communication connection to linked stations executing the communication themselves, as well as combined systems of both variants. This means that the functionalities described may all be contained in one module, which is housed in a control device of a control unit or is connected directly to the bus upstream from the control unit. Similarly, additional variants via the combination of the functionalities with regard to the control unit are possible, as mentioned above, by internally or externally integrating bus interface 106 and 111 into bus controller 108 and 103.

The numbers 104 and 109 indicate transmission units per station, via which a certain transmission rate on the bus may be ensured, or via which a change of this transmission rate, i.e., reading out or writing in data via bus interfaces 106 and 111, or the transmission rate at which this takes place, may be changed. In addition, local time bases 105 and 110, from which local or global times may be formed according to the TTCAN or also FlexRay protocols and via which the communication cycle with the individual transmission time slots may then be established, are optionally contained in each station or in each bus controller. It is also conceivable that such needed time information is not obtained from a time base inherent in each station, possibly via an outside trigger initiated and correctively calculated like a reference message, but exclusively obtained from time information supplied from the outside.

Processing units 107 and 112 are additionally provided, which perform the message comparison according to the present invention or the write-in and read-out of the messages or the particular data or message contents into and out of memory means 114 and 115. These processing units and/or these memory means may be housed in the station itself, namely separate from the bus controller as shown here, but they may also be part of the bus controller. Stations 100 and 101, shown here, may be positioned as a module upstream from a control device or may be contained therein; the functionalities described or modules 108, 112, 115, and 111 may be integrated together, or, depending on the capacity, the function of the processing unit may be taken over by transmission unit 109 or 104, or vice versa. It is equally conceivable that the functions described are taken over by modules within the control device, so that only a simple interface of the control device exists to the bus system. This means that the present invention or the functions needed thereto may be executed by different modules of a station, by a control unit or by the link element to the bus, in particular the bus interface, or by combinations thereof corresponding to the particular application variant, i.e., by different means.

Communication on bus 102 now takes place according to a communication cycle as illustrated in FIGS. 2, 3, and 4 with reference numbers 1, 2, 3, and 4. These numbers 1, 2, 3, and 4 indicate the transmission time slots or transmission slots within a communication cycle. Transmission time slots 1, 2, 3, and 4 may be equidistant, or may also have different lengths or time periods according to a specified plan. As can be seen in FIGS. 2, 3, and 4, messages are unambiguously assigned to individual transmission time slots. This means that one message has a certain position in the communication cycle, ensuring that one transmission slot is used by only one transmitter, which means for one unambiguous message. The above-described possibility of equidistant transmission time slots or transmission time slots having different lengths in turn makes it possible to adapt the length of the transmission slot to the message content, or to adapt the message length according to the desired length of all transmission times. But in all these cases, only one unambiguous message is transmitted per transmission time slot. As pointed out at the beginning, according to the related art, one message is transmitted once per transmission time slot, which, for the desired redundancy, makes an additional transmission time slot for the redundant message necessary in the related art, or obligatorily requires a second communication channel for parallel transmission. As mentioned above, the difficulties arise due to the fact that a communication cycle, once specified and planned, may, if at all, be only belatedly adapted using additional transmission time slots via a very expensive reorganization.

FIG. 2 shows a communication cycle having transmission time slots 1, 2, 3, and 4. Transmission time slot 1 extends from T01 through T11, transmission time slot 2 from T11 through T21, transmission time slot 3 from T21 through T31, and transmission time slot 4 from T31 through T02, a new communication cycle then beginning at T02 with transmission time slot 1. Messages A through D, assigned to time slots 1 through 4, are transmitted in these transmission time slots. The message frames are indicated with 200, 205, 206, and 207 and have different lengths in the example in FIG. 2. It is equally conceivable, as in FIG. 3, to design message frames 300 through 303 equidistantly and, for example, to otherwise fill or leave empty areas in the message frame which are not used by message contents.

FIG. 2 shows message frame 205 from TB1 through TB2, message frame 206 from TC1 through TC2, and message frame 207 from TD1 through TD2. As an example, message frame 200, i.e., message A, is completely fitted into transmission time slot 1. The message is composed of a part 201, an identifier in particular, and a part 202, which contains data in particular. The identifier may identify the transmitting station and/or identify the data contained in part 202. Blocks 203 and 204 are optionally provided, which unambiguously identify the beginning and the end of a message. It should be pointed out that, when unambiguous indicators are used regarding blocks 201, this indicator or identifier at the beginning of the message also may be used for identifying the message beginning. In a special case, unambiguous bit patterns are stored in blocks 203 and 204, through which the beginning and the end of a message or of a message frame is discernible for the bus station. All messages used in the communication cycle may be composed like message A and contain identification 201 (if an initial identifier 203 exists, then the length is shortened by this bit pattern) and a part 202 containing the data (also shortened here, if a bit pattern for end identifier 204 exists).

FIG. 3 also shows a communication cycle including transmission time slots 1 through 4, in which, as mentioned, the message frames of messages A, B, C, D 300 through 303 are equidistant, i.e., time periods T01 through TA, T11 through TB, T2 through TC and T31 through TD are equal. An ideal time is always provided between the end of a message frame and the following transmission time slot, i.e., here TA through T11, TB through T21, TC through T31, and TD through T02. The communication cycles described here and the corresponding messages serve the purpose of clarifying as examples the plurality of possible communication sequences using transmission time slots according to the present invention. An object of the present invention is to leave each selected communication cycle unchanged, but nevertheless to repeatedly transmit certain or all messages on one or on a second communication channel. As shown in FIG. 4 and explained in the following, no additional transmission time slot, for a redundant message in particular, is introduced into the communication cycle at a later time. According to the present invention, due to the increase of the data throughput, for example by doubling, tripling, quadrupling, e.g., from 5 Mbit/s to 10 Mbit/s, or to 15 Mbits/s, or even to 20 Mbit/s, a message is repeatedly transmitted in the transmission time slot initially assigned to it. This means that the time period, i.e., the length of the transmission slot, remains unchanged. However, the repeated transmission of the message in the transmission slot is explicitly permitted.

This is illustrated in FIG. 4 by the multiple transmission of messages A and D. As before, messages A, B, C, and D which are unambiguously allocated to them are transmitted in transmission time slots 1 through 4 from T01 through T11, from T11 through T21, and from T31 through T02. Redundant message frames 400 through 403 of message A are then transmitted in transmission slot 1 from T01 through TA1, from TA2 through TA3, from TA4 through TA5, and from TA6 through TA7. Depending on the degree of redundancy, a different number of identical message frames or identical messages A may be transmitted in one transmission slot. In the example of FIG. 4, messages B and C, i.e., message frames 404 from T11 through TB and message frames 405 from T21 through TC are transmitted non-redundantly. In this example, only message D is redundantly repeatedly transmitted together with message frames 406 through 409, here four times, from T31 through TD1, from TD2 through TD3, from TD4 through TD5, and from TD6 through TD7. As illustrated in FIG. 5, these messages redundantly transmitted may then be stored in particular in their chronological order via memory means, as 500, having memory locations 501 through 504. Depending on the method, all or only a part of the messages redundantly transmitted may be accepted, i.e., stored. It is also possible to provide different degrees of redundancy of the message transmission in different transmission time slots so that, as shown in FIG. 4, for example, message A is repeatedly transmitted in transmission slot 1, while message D is only transmitted twice or three times in transmission slot 4. Fault detection is then easily possible by comparing the redundant messages. At higher degrees of redundancy, an M out of N security is also possible, thus an M out of N deviation is detectable, where N is integral and N>2 and M are also integral and N/2<M<N. This means that in the example of FIG. 4 or 5, a 3 out of 4 security is possible, for example. In a triple transmission, i.e., a three-way redundancy, a 2 out of 3 security is thus possible, or in a five-way redundancy a 3 out of 5 or a 4 out of 5 security, etc. are possible.

The receiving units, i.e., the receiving stations, may unambiguously differentiate the chronologically redundant messages in one transmission slot, since each message has an unambiguous composition, and the beginning and the end of a message is thus detectable. This may take place either via identification or data module, or via explicitly present beginning and/or end identifiers. The protocol layer of the bus system in the particular station may now decide whether each individual message is stored and available for further analysis, or whether the last valid message is stored, or just a certain number of messages are redundantly transmitted. The data transmitted in the data portion and the message identifier, in particular the identification of these redundant messages, do not differ; in contrast, other parts of the messages may be identical or may also be different. The unambiguous allocation of the message into a transmission time slot, i.e., the data being transmitted in this transmission time slot, remains.

In the automobile industry in particular, planning of the communication, and thus the communication cycles, plays a central role in future vehicle design. Maximum utilization of the communication cycle and thus the transmission slot period may be easily achieved, which would be the case at a data rate or transmission rate of 2 Mbit/s to possibly 5 Mbit/s and an average message length of 32 bytes to approximately 128 bytes. In the course of the further development of vehicle platforms, but also in the vehicle or product maintenance and the associated adaptation of the communication cycles or the communication matrix, further redundancies in message transmission may possibly be necessary, e.g., also a time redundancy. With regard to the redundancy of the messages, a transmission via at least two communication channels may be provided as well, which is often not necessary or becomes obsolete due to further development or change. Such a change in the entire communication cycle, i.e., in particular in the allocation of the transmission slots to certain applications/nodes or messages to a fixed position in the communication cycle for such functional enhancements or changes, is largely avoided according to the present invention.

This means that there is only a 1:1 relationship between message slot, i.e., transmission time slot, and message in a standard configuration, as in FIG. 2 or FIG. 3, for example, at a given transmission rate or transmission speed such as 2 Megabit/s, for example. The message is composed in such a way that the beginning and the end of the message may be unambiguously detected, in particular by using an unambiguous identifier for the beginning and the end, whereby the bit coding/bit decoding of a communication decoder of a communication controller or bus controller may unambiguously compile a message from a bit pattern on the communication channel. In principle, this may take place independently from a planned number of messages within a transmission slot so that a different transmission speed may be assigned to each transmission slot. If, as in our example, the transmission rate or transmission speed is quadrupled, e.g., from 2 Megabit/s to 8 Megabit/s, then four consecutive identical messages (i.e., identical with regard to identification and data) may be transmitted within the transmission time slot left unchanged. The message identifier, i.e., the identification, remains the same for all four messages.

The present invention may also be used for transmitting messages having the same identifier, e.g., in a sensor, which frequently records data for transmitting sensor information having the same identifier, but also for transmitting sensor information consecutively from four different points in time; the most current sensor information or the sensor information appropriate for its own computation process may be recorded. In this particular case, monitoring regarding the comparison of the identifications is possible and likewise data of different update status may be transmitted. A combination, e.g., of transmitting data of different update states with or without redundancy is of course possible. The overhead regarding a transmission slot, in particular an ideal phase at the end of a transmission slot, is not increased by this method, since there is only one transmission slot beginning and one transmission slot end.

The coding unit and/or the decoding unit in the bus controller or communication controller is able to transmit or receive all four messages or message frames distinctly from one another. As is illustrated in the example according to FIG. 4 or FIG. 5, in the no-fault case four messages are validly received in one slot. The transmission time or the expected receiving time, very important in time-controlled bus systems for the controlled access to the communication channel and for the time measurement, still refers to the transmission time slot. Therefore, a change in the communication cycle is not necessary. Depending on the implementation or customer preference, all four messages may be copied now into separate message areas, or the last valid message is held in the message area. If, for example, the third and fourth message is faulty, then the message faultlessly received last, i.e., the second message of the transmission slot, is available. This results in the advantages of the present invention clarified in the description above.

What is claimed is:

1. A method for transmitting data in messages on a bus system, the method comprising:
   transmitting messages in transmission time slots at a preselected transmission rate, wherein each transmission time slot is uniquely allocated to a corresponding single message;
   dynamically changing, during transmission of messages, the transmission rate for at least one transmission time slot in such a way that a corresponding single message provided for the at least one transmission time slot is transmitted repeatedly within the at least one transmission time slot;
   comparing at least two of the messages transmitted repeatedly within a transmission time slot with one another; and
   detecting a fault in the event of deviations, with regard to at least parts of the messages;
   wherein N of the messages transmitted repeatedly within a transmission time slot are compared with one another, and, within the scope of an M out of N deviation with regard to at least parts of the messages, at least one message is detected as being faulty, the messages detected as faulty being rejected, wherein M and N are integers, and wherein $N>2$ and $(N/2)<M<N$.

2. A method for transmitting data in messages on a bus system, the method comprising:
   transmitting messages in transmission time slots at a preselected transmission rate, wherein each transmission time slot is uniquely allocated to a corresponding single message; and
   dynamically changing, during transmission of messages, the transmission rate for at least one transmission time slot in such a way that a corresponding single message provided for the at least one transmission time slot is transmitted repeatedly within the at least one transmission time slot;
   wherein the messages contain an identification and data, the identification identifying data content, and the messages transmitted repeatedly within a transmission time slot are identical at least with regard to the identification and the data;
   wherein N of the messages transmitted repeatedly within a transmission time slot are compared with one another, and, within the scope of an M out of N deviation with regard to at least one of the identification and the data, at least one message is detected as being faulty, the messages detected as faulty being rejected, wherein M and N are integers, and wherein $N>2$ and $(N/2)<M<N$.

3. A device for transmitting data in messages, comprising:
   first means for transmitting messages in transmission time slots at a preselected transmission rate, wherein each transmission time slot is uniquely allocated to a corresponding single message; and
   second means for dynamically changing, during transmission of messages, a transmission rate of a transmission time slot in such a way that a corresponding single message provided for the transmission time slot is transmitted repeatedly within the transmission time slot.

4. The device according to claim 3, further comprising third means for unambiguously allocating the messages to particular transmission time slots.

5. The device according to claim 3, further comprising a memory device for storing the messages transmitted repeatedly within a particular transmission time slot in a chronological order of their transmission.

* * * * *